US007991197B2

(12) United States Patent
Natori

(10) Patent No.: US 7,991,197 B2
(45) Date of Patent: Aug. 2, 2011

(54) SHEET IDENTIFYING APPARATUS AND SHEET IDENTIFYING METHOD

(75) Inventor: Naotake Natori, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 916 days.

(21) Appl. No.: 11/500,462

(22) Filed: Aug. 8, 2006

(65) Prior Publication Data
US 2007/0031021 A1 Feb. 8, 2007

(30) Foreign Application Priority Data

Aug. 8, 2005 (JP) ................................ 2005-229928
Jun. 27, 2006 (JP) ................................ 2006-176735

(51) Int. Cl.
*G06K 9/00* (2006.01)
*G06K 9/34* (2006.01)
*G06K 9/36* (2006.01)
*G06K 15/10* (2006.01)

(52) U.S. Cl. ........ 382/112; 382/135; 382/137; 382/140; 382/175; 382/176; 382/180; 382/289; 382/296; 358/1.5

(58) Field of Classification Search ................... 382/112, 382/135, 137, 140, 175, 176, 180, 289, 296, 382/294, 295; 358/1.5
See application file for complete search history.

(56) References Cited

U.S. PATENT DOCUMENTS

| 5,199,543 | A | * | 4/1993 | Kamagami et al. | ........... 194/207 |
| 5,216,724 | A | | 6/1993 | Suzuki et al. | |
| 5,483,606 | A | * | 1/1996 | Denber | .................. 382/294 |
| 5,528,387 | A | * | 6/1996 | Kelly et al. | ................... 358/488 |
| 5,638,496 | A | * | 6/1997 | Sato | .............................. 358/1.9 |
| 5,680,472 | A | * | 10/1997 | Conant | ........................ 382/135 |
| 5,729,623 | A | * | 3/1998 | Omatu et al. | ................. 382/155 |
| 6,415,064 | B1 | * | 7/2002 | Oh | ................................. 382/289 |
| 6,433,896 | B1 | * | 8/2002 | Ueda et al. | ..................... 358/488 |
| 6,480,631 | B2 | * | 11/2002 | So et al. | ........................ 382/248 |

(Continued)

FOREIGN PATENT DOCUMENTS

EP 0 472 192 2/1992

(Continued)

OTHER PUBLICATIONS

Nakai, et al. "Camera-Based Document Image Retrieval as Voting for Partial Signatures of Projected Invariants." Proceedings of the 2005 Eight International Conference on Document Analysis and Recognition. (2005): 384.*

(Continued)

*Primary Examiner* — Matthew Bella
*Assistant Examiner* — Michael A Newman
(74) *Attorney, Agent, or Firm* — Pillsbury Winthrop Shaw Pittman, LLP

(57) ABSTRACT

The class of a sheet is efficiently estimated and a pattern identification process which is robust to a variation in the medium can be performed by dividing an image pattern of the sheet into a plurality of areas (pixels or sets of pixels), weighting and selecting the areas, attaining the identification results for the respective areas and determining the identification result of the whole portion based on a logical combination of the identification results. Particularly, since the area weighting and selecting process is performed based on a difference between the classes and a variation in the class, the calculation amount can be reduced and the identification performance which is higher than that of a method which uniformly processes the whole portion of the pattern can be attained.

8 Claims, 14 Drawing Sheets

U.S. PATENT DOCUMENTS

| | | | |
|---|---|---|---|
| 6,741,743 B2 * | 5/2004 | Stalcup et al. | 382/217 |
| 6,766,045 B2 * | 7/2004 | Slepyan et al. | 382/135 |
| 6,785,405 B2 * | 8/2004 | Tuttle et al. | 382/112 |
| 7,502,493 B2 * | 3/2009 | Ishida | 382/118 |
| 2004/0076341 A1 * | 4/2004 | Dolan | 382/289 |
| 2006/0177118 A1 * | 8/2006 | Ibikunle et al. | 382/137 |
| 2007/0122060 A1 * | 5/2007 | Hardy et al. | 382/286 |

FOREIGN PATENT DOCUMENTS

| | | |
|---|---|---|
| EP | 1 484 719 | 12/2004 |
| JP | 09-134464 | 5/1997 |
| WO | WO 95/23388 | 8/1995 |
| WO | WO 2004080865 A1 * | 9/2004 |

OTHER PUBLICATIONS

Bloomberg, et al. "Measuring Document Image Skew and Orientation." IS&T/SPIE EI'95, Conference 2422: Document Region II. (1995): 302-316.*

Hull, Jonathan J. "Document Image Skew Detection: Survey and Annotated Bibliography." Document Analysis Systems II. (1998): 40-64.*

European Search Report dated Apr. 22, 2008 for Appln. No. 06016527.1-2211.

European Search Report dated Apr. 27, 2010.

* cited by examiner

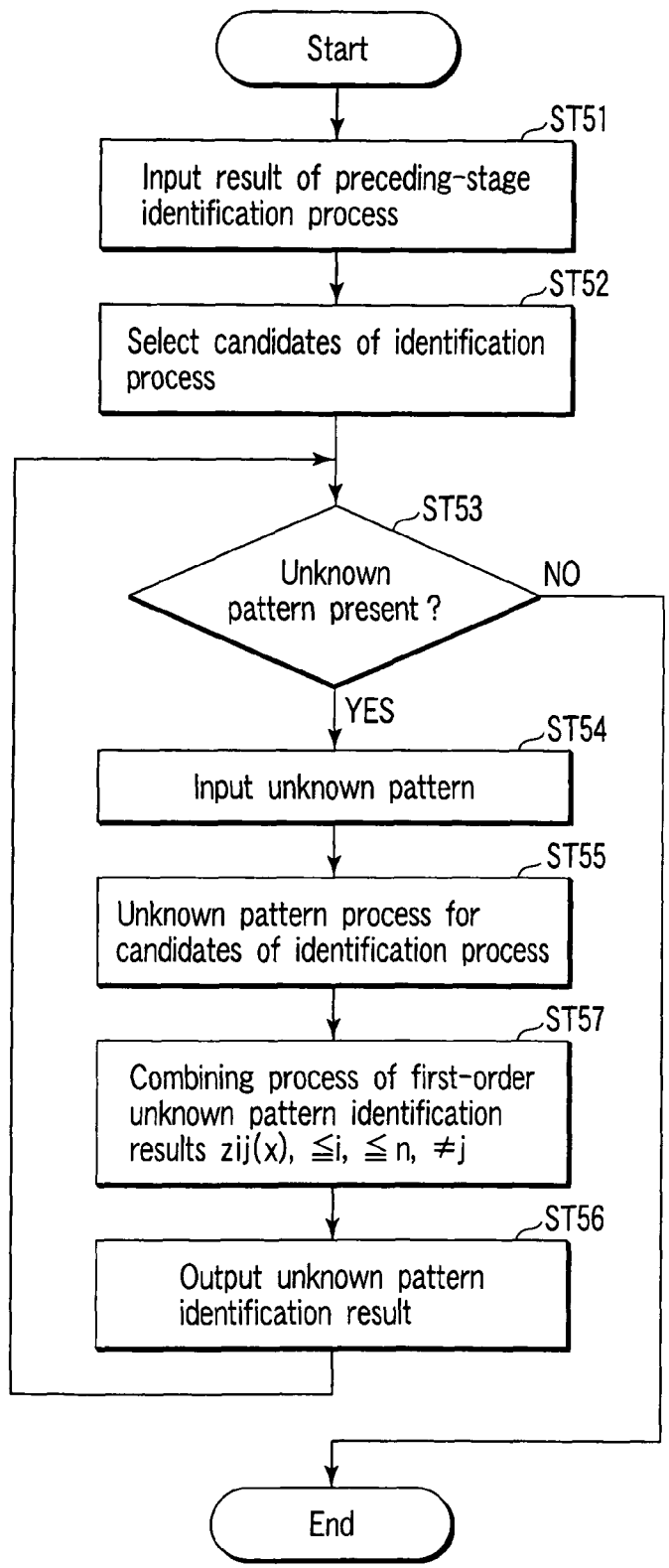
F I G. 12

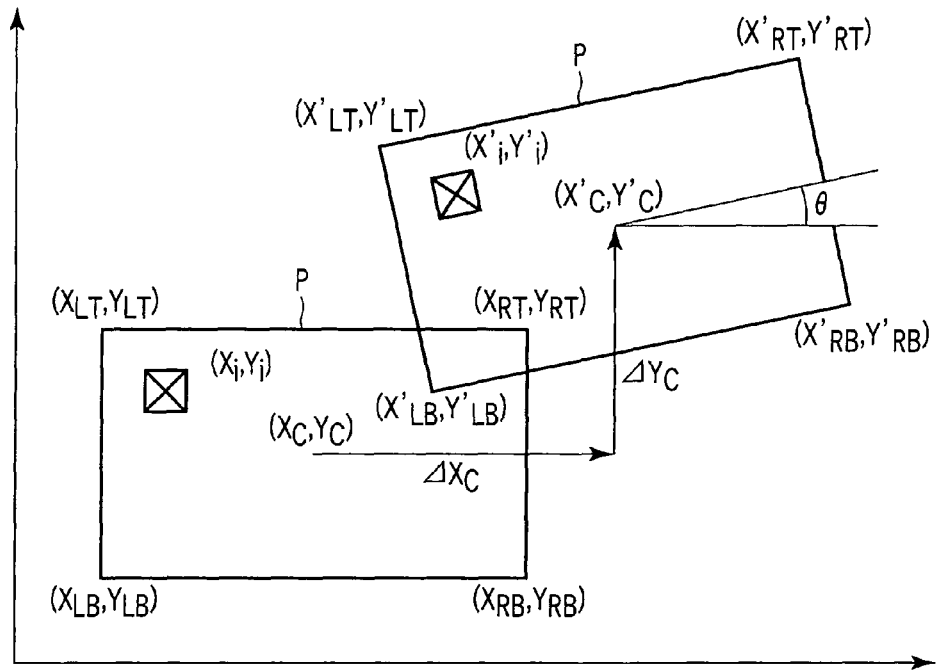
F I G. 15
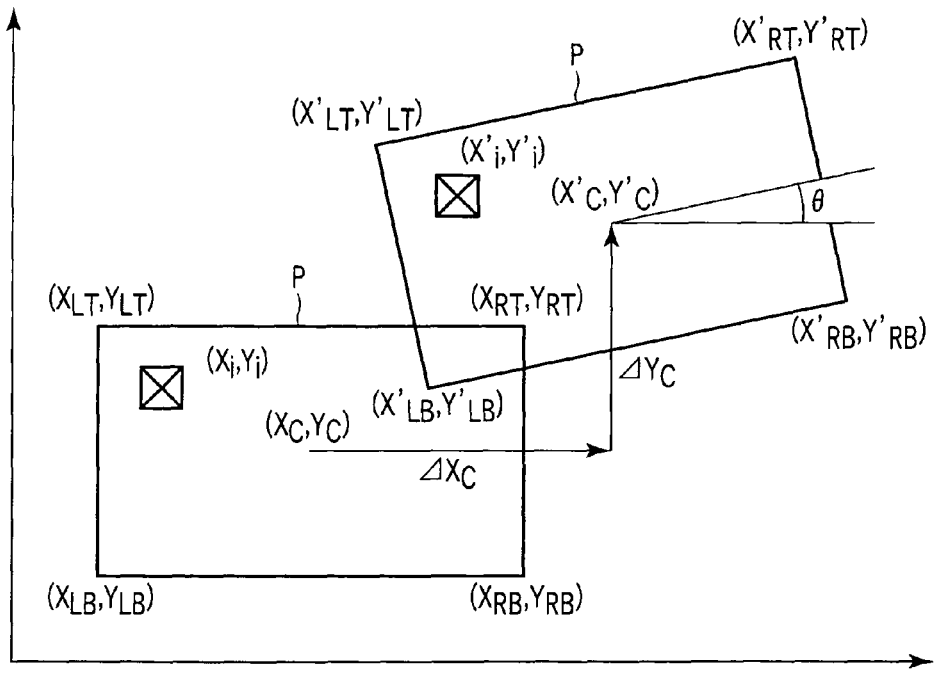
F I G. 16

P3: 
| 66 | 0 | 66 |
|---|---|---|
| 0 | 50 | 0 |
| 34 | 0 | 0 |

Input pattern

P4:
| 80 | 0 | 80 |
|---|---|---|
| 0 | 60 | 0 |
| 40 | 0 | 0 |

Reference pattern

Offset and concentration gain of reference pattern are swung in preset range

| | | Concentration offset | | | | |
|---|---|---|---|---|---|---|
| | | −2 | −1 | 0 | +1 | +2 |
| Concentration gain | 80% | 62,0,62 / 0,46,0 / 30,0,0 Distance=16 | 63,0,63 / 0,47,0 / 31,0,0 Distance=12 | 64,0,64 / 0,48,0 / 32,0,0 Distance=8 | 65,0,65 / 0,49,0 / 33,0,0 Distance=4 | 66,0,66 / 0,50,0 / 34,0,0 Distance=0 (best) |
| | 90% | 70,0,70 / 0,52,0 / 34,0,0 Distance=10 | 71,0,71 / 0,53,0 / 35,0,0 Distance=14 | 72,0,72 / 0,54,0 / 36,0,0 Distance=18 | 73,0,73 / 0,55,0 / 37,0,0 Distance=22 | 74,0,74 / 0,56,0 / 38,0,0 Distance=26 |
| | 100% | 78,0,78 / 0,58,0 / 38,0,0 Distance=36 | 79,0,79 / 0,59,0 / 39,0,0 Distance=40 | 80,0,80 / 0,60,0 / 40,0,0 Distance=44 | 81,0,81 / 0,61,0 / 41,0,0 Distance=48 | 82,0,82 / 0,62,0 / 42,0,0 Distance=52 |
| | 110% | 86,0,86 / 0,64,0 / 42,0,0 Distance=62 | 87,0,87 / 0,65,0 / 43,0,0 Distance=66 | 88,0,88 / 0,66,0 / 44,0,0 Distance=70 | 89,0,89 / 0,67,0 / 45,0,0 Distance=74 | 90,0,90 / 0,68,0 / 46,0,0 Distance=78 |
| | 120% | 94,0,94 / 0,70,0 / 46,0,0 Distance=88 | 95,0,95 / 0,71,0 / 47,0,0 Distance=92 | 96,0,96 / 0,72,0 / 48,0,0 Distance=96 | 97,0,97 / 0,73,0 / 49,0,0 Distance=100 | 98,0,98 / 0,74,0 / 50,0,0 Distance=104 |

FIG. 19

SHEET IDENTIFYING APPARATUS AND SHEET IDENTIFYING METHOD

CROSS-REFERENCE TO RELATED APPLICATIONS

This application is based upon and claims the benefit of priority from prior Japanese Patent Applications No. 2005-229928, filed Aug. 8, 2005; and No. 2006-176735, filed Jun. 27, 2006, the entire contents of both of which are incorporated herein by reference.

BACKGROUND OF THE INVENTION

1. Field of the Invention

This invention relates to a sheet identifying apparatus and sheet identifying method which identify the type and truth/false of each sheet such as a paper sheet by comparing an image pattern acquired from the sheet with preset reference patterns in an automatic checking apparatus for sheets such as securities.

2. Description of the Related Art

Generally, an identification process for a digital image pattern (which is hereinafter simply referred to as a pattern) tends to require a sensor input of higher resolution as it is desired to perform a higher-degree identification process. However, at this time, it is required to realize the process on the real-time basis with lower calculation cost from the viewpoint of practicality.

Therefore, various methods of selecting and processing part of the pattern (pixels or sets of pixels) are proposed. Generally, since the pattern contains much redundancy, a sufficiently high identification performance can be attained by adequately selecting portions of the pattern and performing a small amount of calculations with the resolution kept high.

For example, the technique for narrowing down to-be-processed pixels by performing a random pixel selecting operation and attaining both of the high-degree resolution and high-speed processes is known (for example, refer to Jpn. Pat. Appln. KOKAI Publication No. H9-134464). With the above well-known technique, since the pixel selecting operation is randomly performed for each checking process, it becomes practically impossible to detect a checking portion thereby to enhance the reliability.

- - - . However, with the above well-known technique, positional weighting is not taken into consideration and it is considered desirable to uniformly distribute the selected pixels in the entire pattern area. Certainly, in order to make it difficult to detect the checking portion, it is idealistic to uniformly select the pixels from the entire pattern area. However, generally, a method of uniformly processing the entire pattern area to attain an identification result has a problem that a local feature cannot be sufficiently distinctly identified or a local variation in the medium (stain, light brush-stroke or the like) gives an influence on the identification performance.

Therefore, it is desired to develop an identification method which can sufficiently identify a local feature while maintaining the high-speed operation and high reliability.

Further, when part of the pattern is selected and processed, an influence is given by a fluctuation in the printing concentration, skewing and sliding of the sheet caused by the feeding state of the sheet in some cases.

BRIEF SUMMARY OF THE INVENTION

Accordingly, an object of this invention is to provide a sheet identification apparatus and sheet identification method which can efficiently estimate classes of sheets such as paper sheets and perform a pattern identification process which is robust to a variation in the medium by dividing an image pattern of each sheet into a plurality of areas (pixels or sets of pixels), weighting and selecting the areas, attaining the identification results for the respective areas and determining the identification result of the whole portion based on a logical combination of the identification results.

According to a first aspect of this invention, there is provided a sheet identification apparatus which identifies types and truth/false of sheets to be identified by comparing an image pattern acquired from the sheet with preset reference patterns and comprises area dividing means for dividing the image pattern acquired from the sheet into a plurality of areas, weighting means for weighting the areas divided by the area dividing means, area selecting means for selecting areas used for identification from the areas weighted by the weighting means, identification result acquiring means for acquiring a result of identification with the reference pattern for each area selected by the area selecting means, and identification result determining means for determining an identification result of a whole portion by a logical combination of the identification results for the respective areas acquired by the identification result acquiring means.

According to a second aspect of this invention, there is provided a sheet identification method which identifies a type and truth/false of a sheet to be identified by comparing an image pattern acquired from the sheet with preset reference patterns and comprises an area dividing step of dividing the image pattern acquired from the sheet into a plurality of areas, a weighting step of weighting the areas divided by the area dividing step, an area selecting step of selecting areas used for identification from the areas weighted by the weighting step, an identification result acquiring step of acquiring a result of identification with the reference pattern for each area selected by the area selecting step, and an identification result determining step of determining an identification result of a whole portion by a logical combination of the identification results for the respective areas acquired by the identification result acquiring step.

According to this invention, a sheet identification apparatus and sheet identification method can be provided which can efficiently estimate the class of each sheet and perform a pattern identification process which is robust to a variation in the medium by dividing an image pattern of the sheet into a plurality of areas (pixels or sets of pixels), weighting and selecting the areas, attaining the identification results for the respective areas and determining the identification result of the whole portion based on a logical combination of the above identification results.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 12 is a flowchart for illustrating a sheet identifying process according to a modification of the fourth embodiment.

FIGS. 15 and 16 are schematic diagrams for illustrating the sheet feeding state in the sixth embodiment.

FIG. 19 is a schematic diagram for illustrating the concentration changing way in the seventh embodiment.

DETAILED DESCRIPTION OF THE INVENTION

There will now be described embodiments of this invention with reference to the accompanying drawings.

A sheet identifying apparatus according to this invention identifies the types and truth/false of sheets (media) such as paper sheets based on image patterns of the sheets. For example, it identifies the types (classes, denominations) and truth/false of the sheets based on image patterns (image data) acquired by optically reading images printed on the paper sheets such as securities (such as banknotes).

First, a first embodiment of this invention is explained below.

Figure 1:
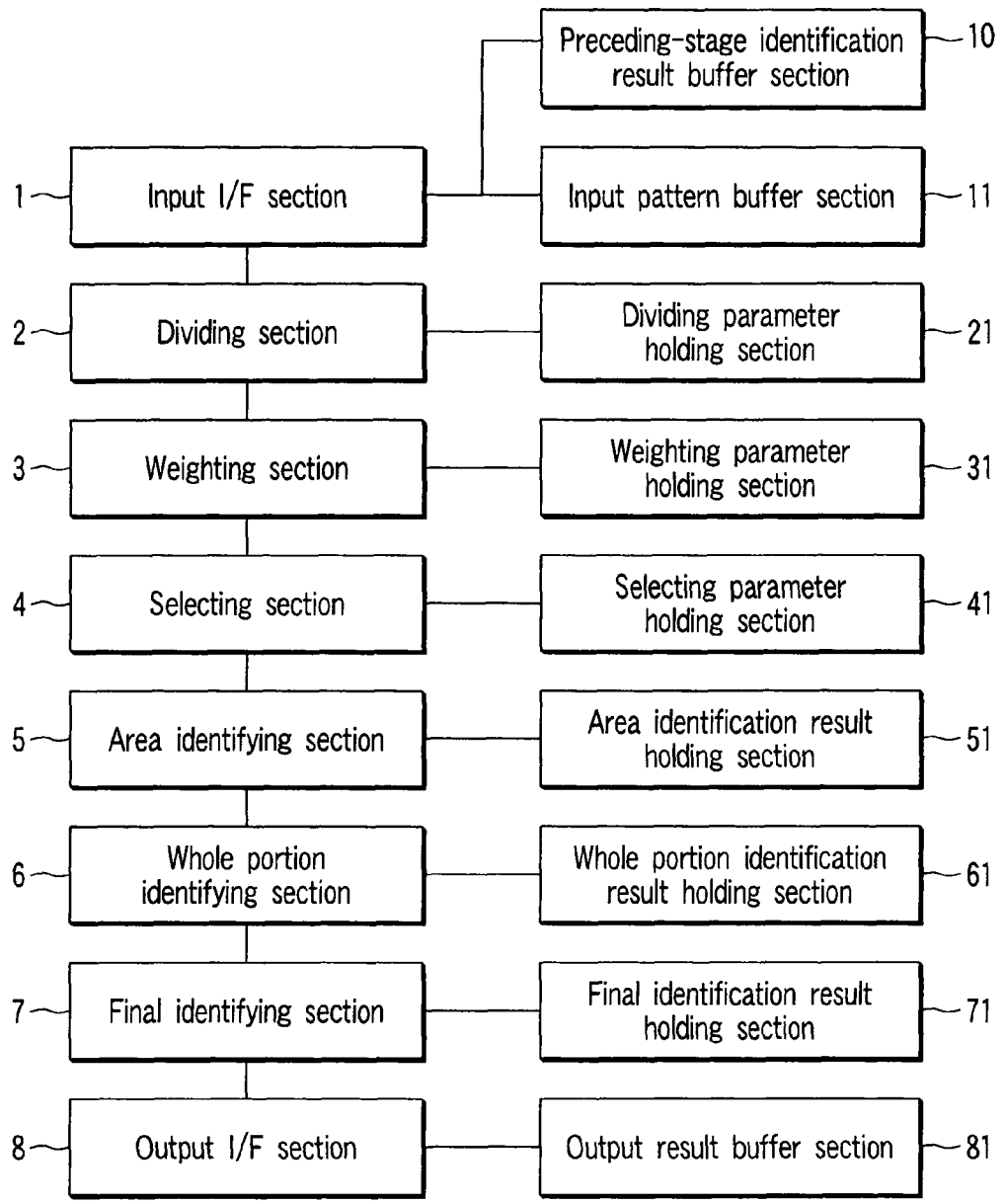
FIG. 1 is a block diagram schematically showing the configuration of a sheet identifying apparatus according to one embodiment of this invention.

FIG. 1 schematically shows the configuration of a sheet identifying apparatus according to one embodiment of this invention. The sheet identifying apparatus includes an input interface (I/F) section 1 which inputs an image pattern (input pattern) acquired by optically reading an image on a sheet such as a paper sheet, a preceding-stage identification result buffer section 10 which temporarily stores the preceding-stage identification result and candidates obtained as the result of the identification process, and an input pattern buffer section 11 which temporarily stores an image pattern (input pattern) input. Further, it includes a dividing section 2 used as area dividing means for dividing the input image pattern into a plurality of areas, a dividing parameter holding section 21 which holds dividing parameters, a weighting section 3 used as weighting means for weighting the divided areas, a weighting parameter holding section 31 which holds weighting parameters, a selecting section 4 used as area selecting means for selecting an area used for identification from the weighted areas, and a selection parameter holding section 41 which holds selecting parameters. In addition, it includes an area identifying section 5 used as identification result acquiring means for acquiring an identification result with a reference pattern for each selected area, an area identification result holding section 51 which holds the identification result for each area, a whole portion identifying section 6 which identifies the identification result of the whole portion, a whole portion identification result holding section 61 which holds the identification result of the whole portion, a final identifying section 7 used as identification result determining means for determining the identification result of the whole portion by use of a logical combination of the identification results for the respective areas, a final identification result holding section 71 which holds the final identification result, an output interface (I/F) section 8 which outputs the identification result, and an output result buffer section 81 which temporarily stores the output result.

Figure 2:
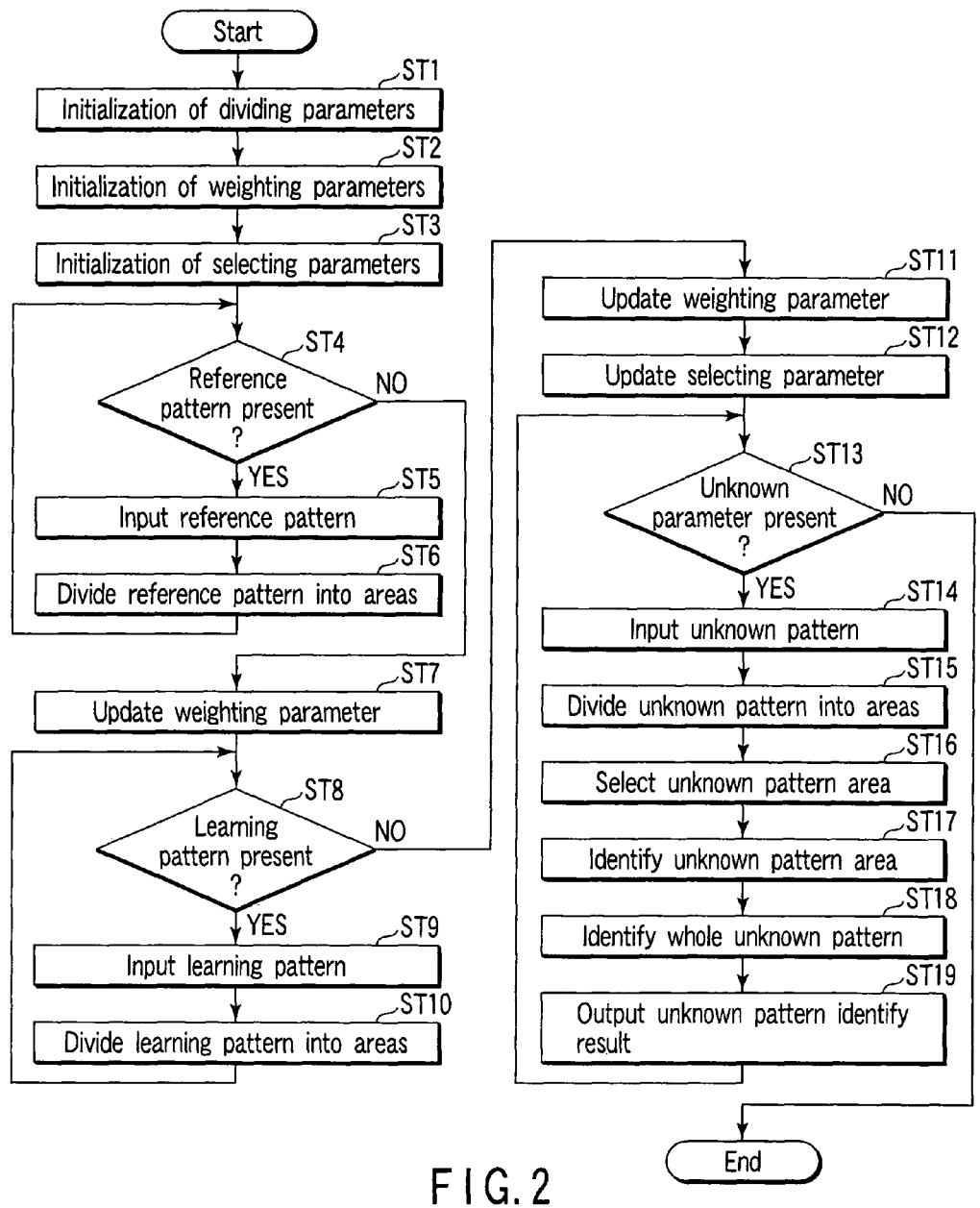
FIG. 2 is a flowchart for illustrating the sheet identifying process according to the first embodiment.

FIG. 2 is a flowchart for illustrating the sheet identifying process according to the first embodiment. The identification process is explained below based on the above flowchart.

Figure 3:
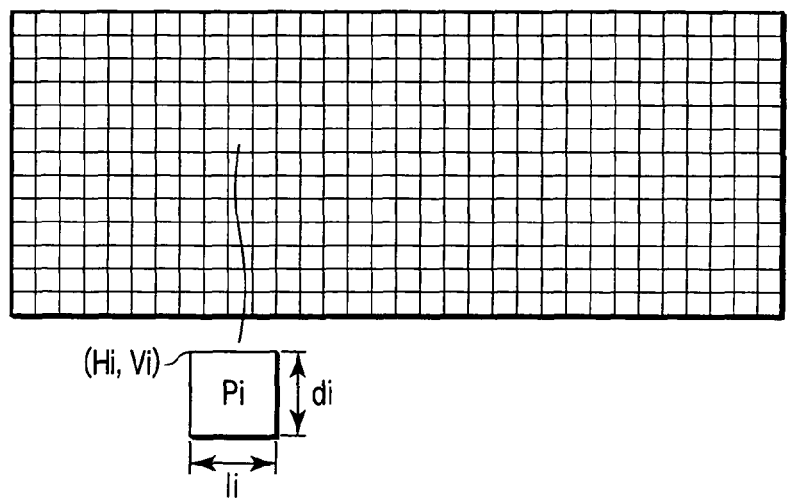
FIG. 3 is a diagram for illustrating a pattern area dividing way and divided parameters.
Figure 4:
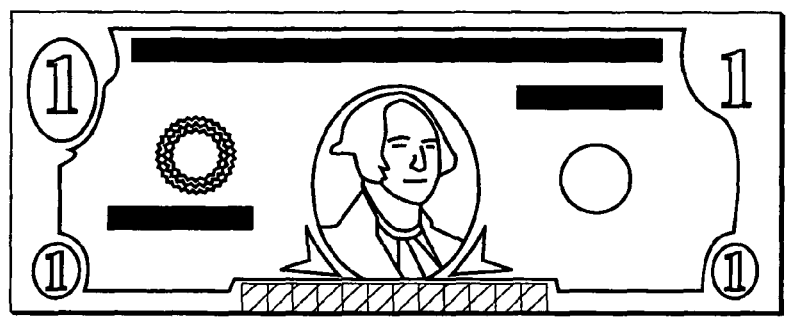
FIG. 4 is a view showing one example of a reference pattern of a class A.

First, dividing parameters are initialized (ST1). In this case, the dividing patterns indicate concrete numerical values which express area division of each pattern. For example, in FIG. 3, a case wherein an input pattern is uniformly divided into areas of 32 in the lateral direction and 13 in the longitudinal direction (416 in total) in a lattice form is shown as an example. At this time, the dividing parameters are expressed as follows, for example.

$$p_i = \{h_i, v_i, l_i, d_i\}$$

where $p_i$ indicates a dividing parameter of an i-th area ($1 \leq i \leq 416$), $h_i$ indicates the horizontal coordinate of a start point of the i-th area, $v_i$ indicates the vertical coordinate of the start point of the i-th area, $l_i$ indicates the horizontal width of the i-th area, and $d_i$ indicates the vertical height of the i-th area. In the dividing parameter initialization process, a concrete numerical value is substituted into $p_i$.

Next, weighting parameters are initialized (ST2). The weighting parameter expresses the degree of importance of an area, but since the degrees of importance of the areas are not clear in the initial state, all of the weighting parameters are set to the same value. That is, the following equation is attained.

$$w_i = 1/416$$

where $w_i$ indicates a weighting parameter of the i-th area.

Further, selecting parameters are initialized (ST3). If the selecting parameter is set as Q, the selecting parameter Q is divided into a selection rate $q_0$ and selected area number $q_j$ ($j \geq 1$). That is, the following equation is obtained.

$$Q = \{q_0, q_1, q_2, \ldots\}$$

The selection rate is a ratio of the selected area to the entire area. That is, the following expression is set.

$$0.0 \leq q_0 \leq 1.0$$

The number of the area selected at this time is set to a selected area number. The number of selected area numbers is determined according to the selection rate. In this embodiment, the value of the selected area number is set in the following range.

$$1 \leq q_j \leq 416$$

In the initial state, since the degrees of importance of the respective areas are not clear, adequate values are registered. For example, if the selection rate $q0=0.25$, the selection parameter Q is initialized as follows.

$$Q=\{0.25,1,2,\ldots,104\}$$

If the parameter initialization process is completed, a reference pattern is input. For clarifying the explanation, in the present embodiment, the number of classes of the pattern is set to "2" and a 2-class identification problem is dealt with. FIGS. 4, 5 and FIGS. 6, 7 schematically show two patterns of different classes. In this case, the reference pattern is a pattern used as a reference of a class which is free from an influence by a stain of a medium and an input variation. One reference pattern is set for each class.

Figure 5:
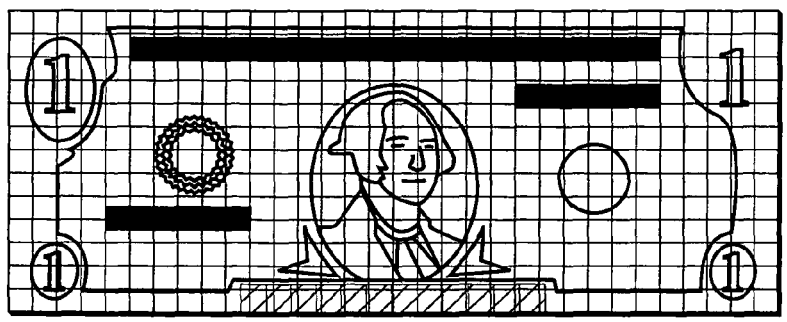
FIG. 5 is a view schematically showing the area dividing state for the reference pattern of the class A.
Figure 6:
FIG. 6 is a view showing one example of a reference pattern of a class B.
Figure 7:
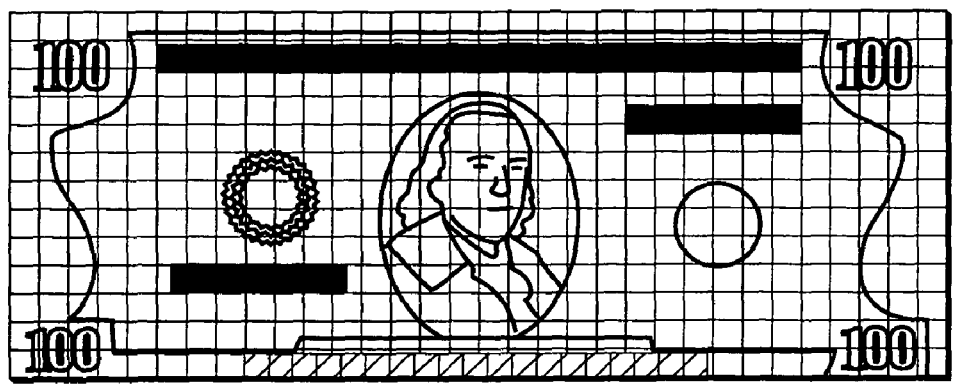
FIG. 7 is a view schematically showing the area dividing state for the reference pattern of the class B.

Further, each class to which the reference pattern belongs is known. When such a reference pattern is input, the area dividing process is performed. The area dividing process as shown in FIG. 5 is performed for the reference pattern (class A) shown in FIG. 4. Further, the area dividing process as shown in FIG. 7 is performed for the reference pattern (class B) shown in FIG. 6. FIGS. 5 and 7 schematically show the state of area division. The reference pattern input process and the area dividing process are repeatedly performed for all of the classes (ST4 to ST6).

When the reference pattern input process and the area dividing process for all of the classes are completed, the weighting parameter is updated (ST7). At this stage, the weighting parameter is updated according to a difference between the classes. For example, if reference patterns for the two classes A and B are expressed by a(0) and b(0) and the number of pixels contained in one area is set to N, the feature amounts are expressed as follows, for example.

$$f(a(0),i)=\{a(0,i,1),a(0,i,2),\ldots,a(0,i,n),a(0,i,N)\}$$

$$f(b(0),i)=\{b(0,i,1),b(0,i,2),\ldots,b(0,i,n),b(0,i,N)\}$$

where $f(a(0), i)$ and $f(b(0), i)$ are feature amounts of the i-th areas of a(0) and b(0) ($1 \leq i \leq 416$). Further, a(0, i, n) and b(0, i, n) are pixel values of n-th pixels of the i-th areas of a(0) and b(0) ($1 \leq n \leq N$).

That is, the feature amount is an n-dimensional vector determined by the N pixel values. At this time, the weighting parameters are calculated as follows.

$$wi=D(f(a(0),i),f(b(0),i))/\Sigma i\{D(f(a(0),i),f(b(0),i))\}$$

where $D(f(a(0), i), f(b(0), i))$ is Euclid distance between a(0) and b(0) in the i-th areas and is expressed as follows.

$$D(f(a(0),i),f(b(0),i))=\mathrm{sqrt}[\Sigma n\{b(0,i,n)-a(0,i,n)\}2]$$

That is, the weighting parameter is derived as a value obtained by dividing the distances between the reference patterns for the respective areas by the total sum of the differences between the reference patterns of all of the areas. Generally, since it can be considered more advantageous for identification between classes in an area in which the distance between the reference patterns representing the class is longer, the above process is adequate as the first stage of the area weighting process.

However, there occurs a case wherein an area which varies in the class depending on an object pattern is present. For example, stumps, signatures, symbols or numbers may be provided. In order to attain more stable identification between the classes, the areas should be less weighted. Therefore, in the present embodiment, the weighting parameter is tuned by use of a learning pattern. In this case, the learning pattern is a sample belonging to a class which is known except the reference pattern. It is preferable that the learning pattern have a certain number of samples and reflect the distribution of sets of all of the patterns of the classes to which they belong. If the learning pattern is input, the area-dividing process is performed like the case of the reference pattern. The learning pattern input process and the area dividing process are repeatedly performed for all of the samples of all of the classes (ST8 to ST10).

When the learning pattern input process and the area dividing process for all of the samples of all of the classes are completed, the weighting parameter is updated (ST11). At this stage, the weighting parameter is updated according to a variation in the class. For example, if M learning patterns for the two classes A and B are expressed by a(k) and b(k) ($1 \leq k \leq M$), the following equations indicating values expressing variations can be attained.

$$s(a,i)=\Sigma k\|f(a(k),i)-\mu(a,i)\|i)\|$$

$$s(b,i)=\Sigma k\|f(b(k),i)-\mu(b,i)\|$$

where s(a, i) and s(b, i) indicate variation values of the i-th areas of the classes A and B and $\mu(a(k), i)$ and $\mu(b(k), i)$ indicate average vectors of the i-th areas of the classes A and B. That is, the variation values in the present embodiment are obtained by deriving standard deviations of the learning patterns of the respective classes for the respective areas. At this time, the weighting parameter is updated as follows.

$$wi \leftarrow wi/\{s(a)+s(b,i)\}$$

That is, it is obtained by dividing the original weighting value by the sum of variation values of the classes A and B. After updating, the normalization process is performed as follows.

$$wi \leftarrow wi/\Sigma iwi$$

Thus, the weighting parameter is determined by taking the difference between the classes and the variation in the class into consideration.

Next, the selecting parameter is updated (ST12). In the present embodiment, parameters of a number corresponding to the selection rate Q are selected from the upper position in an order of increasing weighting degrees. For example, in the case of selection rate $q0=0.25$, the numbers of 104 areas which are ¼ of the 416 areas are registered in an order of increasing weighting degrees as selected area numbers qj. Thus, the area weighting and selecting processes based on the difference between the classes and the variation in the class are performed and the learning phase is completed.

Next, an identification phase is explained. In the identification phase, an unknown pattern is input and the identification result is output. The unknown pattern is a sample belonging to a class which is unknown. If such an unknown pattern is input (ST13, ST14), the area diving process is performed like the case of the reference pattern and learning pattern (ST15).

Next, an area specified by the selecting parameter is selected (ST16). Further, the identification process is performed for each of the selected areas (ST17 to ST19).

In this invention, the algorithm of the identification process itself is not particularly limited, but in the case of a 2-class identification problem, the result of the identification process is set to one of "class A", "class B" and "reject". The most primitive identification algorithm utilizes Euclid distance between the reference pattern and an unknown pattern. For example, if the unknown pattern is x and the identification result of an i-th area for the unknown pattern x is z(x, i), the following relations can be obtained.

$$z(x,i)=\text{class } A(\text{if } D(f(x,i),f(b(0),i))>D(f(x,i),f(a(0),i))+\epsilon)$$

$$z(x,i)=\text{class } B(\text{if } D(f(x,i),f(a(0),i))>D(f(x,i),f(b(0),i))+\epsilon)$$

$$z(x,i)=\text{reject}(\text{if } |D(f(x,i),f(a(0),i))-D(f(x,i),f(b(0),i))| \leq \epsilon)$$

where $\epsilon$ is an adequate constant to define significant difference between the classes.

Next, the whole identification result is determined based on the identification results for the respective areas. As described before, this invention is featured in that the identification result is temporarily obtained for each area and the identification result of the whole portion is determined based on the majority rule, logical equation or weighting process thereof.

Conventionally, for example, the Euclid distance for each area is derived as described before and the simple mean or weighted mean is derived and then the whole identification result is determined without deriving the identification result for each area. However, there occurs a problem that the local feature cannot be sufficiently identified and the local medium variation (stain, light brush-stroke or the like) gives an influence on the identification performance.

According to the present embodiment, since the local feature is not dependent on the other portion and the local variation can be acquired without giving an influence by a local variation on the other portion, the identification process of higher precision can be realized. For example, if an unknown pattern is x and the whole identification result for the unknown pattern x is $z(x)$, the following relations can be attained in the case of the majority rule.

$$z(x)=\text{class } A(\text{if } \Sigma i|(z(x,i)=\text{class } A)\text{most frequently occurs})$$

$$z(x)=\text{class } B(\text{if } \Sigma i|(z(x,i)=\text{class } B)\text{most frequently occurs})$$

$$z(x)=\text{reject}(\text{if } \Sigma i|(z(x,i)=\text{reject})\text{most frequently occurs})$$

where $\Sigma i|(z(x,i)=\text{class A})$, $\Sigma i|(z(x,i)=\text{class B})$ and $\Sigma i|(z(x,i)=\text{reject})$ indicate the numbers of areas in which the area identification results become "class A", "class B" and "reject".

Further, the identification result of the whole portion can be determined by expressing the relation between $\rho i|(z(x,i)=\text{class A})$, $\Sigma i|(z(x,i)=\text{class B})$ and $\Sigma i|(z(x,i)=\text{reject})$ by use of logical equations.

For example, $z(x)=\text{class A}$ if the following condition is satisfied.

$$\Sigma i|(z(x,i)=\text{class } B)/\Sigma i|(z(x,i)=\text{class } A)<\alpha \text{ and } (\Sigma i|(z(x,i)=\text{class } A)+\Sigma i|(z(x,i)=\text{class } B)>\Sigma i|(z(x,i)=\text{reject})+\beta$$

$z(x)=\text{class B}$ if the following condition is satisfied.

$$\Sigma i|(z(x,i)=\text{class } A)/\Sigma i|(z(x,i)=\text{class } B)<\alpha=\text{reject})+\beta$$

$z(x)=\text{reject}$ in other cases.

where $\alpha$ is an adequate constant to define significant difference between the classes and $\beta$ is an adequate constant which adjusts the rate of "reject". Thus, the fact that the behavior of the whole identification can be easily adjusted according to the parameters ($\alpha$, $\beta$ or the like) is also the feature of this invention.

Further, the weighted majority rule and weighted logical equation can be utilized by taking the degrees of weighting of the weighted parameters on the majority rule and logical equation into consideration. That is, the following relations can be obtained.

$$z(x)=\text{class } A(\text{if } \Sigma iwi|(z(x,i)=\text{class } A)\text{most frequently occurs})$$

$$z(x)=\text{class } B(\text{if } \Sigma iwi|(z(x,i)=\text{class } B)\text{most frequently occurs})$$

$$z(x)=\text{reject}(\text{if } \Sigma iwi|(z(x,i)=\text{reject})\text{most frequently occurs})$$

Alternatively, $z(x)=\text{class A}$ if the following condition is satisfied.

$$\Sigma iwi|(z(x,i)=\text{class } B)/\Sigma iwi|(z(x,i)=\text{class } A)<\alpha \text{ and } (\Sigma iwi|(z(x,i)=\text{class } A)+\Sigma iwi|(z(x,i)=\text{class } B)>\Sigma iwi|(z(x,i)=\text{reject})+\beta$$

$z(x)=\text{class B}$ if the following condition is satisfied.

$$\Sigma iwi|(z(x,i)=\text{class } A)/\Sigma iwi|(z(x,i)=\text{class } B)<\alpha \text{ and } (\Sigma iwi|(z(x,i)=\text{class } A)+\Sigma iwi|(z(x,i)=\text{class } B)>\Sigma iwi|(z(x,i)=\text{reject})+\beta$$

$z(x)=\text{reject}$ in other cases.

The identification result $z(x)$ of the unknown pattern obtained by the above process is output (ST19).

Thus, according to the first embodiment, it becomes possible to efficiently estimate the class of the sheet or paper sheet and perform a pattern identification process which is robust to a variation in the medium by dividing an image pattern of the paper sheet into a plurality of areas (pixels or sets of pixels), weighting and selecting the areas, attaining the identification results for the respective areas and determining the identification result of the whole portion based on a logical combination of the identification results.

Particularly, since the areas are weighted and selected based on the difference between the classes and a variation in the class, the amount of calculations can be reduced and the high identification performance can be attained in comparison with the method of uniformly processing the whole portion of the pattern.

Further, since the identification results are temporarily obtained for the respective areas and the whole identification result is determined based on the majority rule, logical equation or weighting process thereof, the local feature is not dependent on the other portion and the local variation can be acquired without giving an influence by the local variation on the other portion in comparison with the simple mean of the feature amounts for the respective areas and the behavior of the whole identification process can be simply adjusted by use of the parameters.

Next, a second embodiment of this invention is explained.

Figure 8:
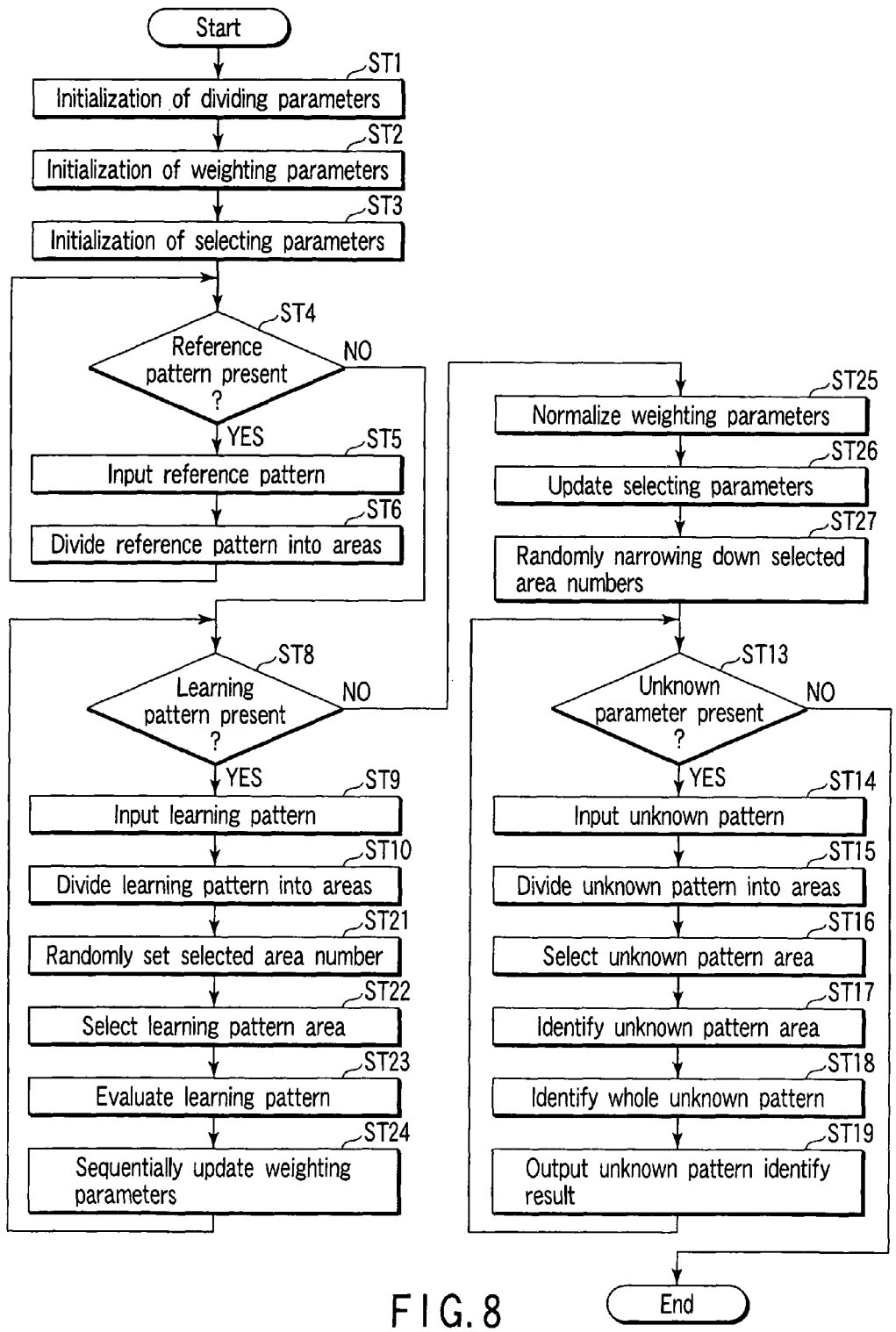
FIG. 8 is a flowchart for illustrating a sheet identifying process according to a second embodiment of this invention.

FIG. 8 is a flowchart for illustrating a sheet identifying process according to the second embodiment. Initialization of dividing parameters, initialization of weighting parameters and initialization of selecting parameters (ST1, ST2, ST3) are the same as those of the first embodiment and the explanation thereof is omitted. In the second embodiment, a random area selecting process is repeatedly performed while a learning pattern is being input and the weighting parameters are sequentially optimized based on the evaluation.

After the initialization processes of the parameters are completed, a reference pattern is input like the first embodiment (ST4 to ST6). In the second embodiment, in order to clarify the explanation, the number of classes of the pattern is set to "2" and a 2-class identification problem is dealt with. The reference pattern is a pattern used as a reference of a class which is free from an influence due to a stain of a medium and an input variation. One reference pattern is set for each class. Further, a class to which the reference pattern belongs is known.

When such a reference pattern is input, the area dividing process is performed. The reference pattern input process and the area dividing process are repeatedly performed for all of the classes. In the second embodiment, the operation of updating the weighting parameters using the reference patterns of the first embodiment is not performed.

Next, like the first embodiment, a learning pattern is input (ST8, ST9). It is preferable for the learning pattern to have a certain number of samples and reflect the distribution of sets of all of the patterns of a class to which the pattern belongs. When the learning pattern is input, the area dividing process is performed (ST10).

At this time, the selected area numbers are randomly set (ST21). For example, if the selection rate q0=0.25, the numbers of 104 areas which are ¼ of the 416 areas are randomly extracted without overlapping and registered as selected area numbers qj (ST22).

Next, the randomly selected area is evaluated (ST23). The basic evaluation method is to enhance the degree of the weighting parameter of the selected area if the area is effective for identification of the input learning pattern and lower the degree of the weighting parameter of the selected area if it is ineffective. The way of determining "effective" or "ineffective" is not limited in this invention. However, the most primitive evaluation algorithm is attained by using the Euclid distance between the reference pattern and the learning pattern. For example, when the reference patterns of the two classes are set to a(0) and b(0) and the learning pattern belonging to the class A is y, then the following relation can be attained.

$$wi \leftarrow wi+\delta \text{ if } \Sigma iD(f(y,i),f(b,(0),i)) > D(f(y,i),f(a(0),i))+\theta$$

$wi \leftarrow wi+\delta$ in other cases where $\theta$ is an adequate constant to define whether the area selection is effective or not and $\delta$ is a small correction item ($\delta>0$) with respect to wi. The weighting parameter updating operation is repeatedly performed for all of the learning patterns (ST24) and the normalization process is performed as follows after the updating operation (ST25).

$$wi \leftarrow wi/\Sigma iwi$$

Thus, the random area selection and evaluation operations are alternately and repeatedly performed and the weighting parameter based on the evaluation is determined.

Next, the selection parameter is updated, but the contents thereof are sequentially registered as the selected area numbers in the order of increasing degrees of weighting like the first embodiment (ST26). In the second embodiment, the feature that the selected area numbers are further narrowed down (ST27) is attained. Thus, the learning phase is completed.

The identification phase (after the unknown pattern input operation (ST13 to ST19)) of the second embodiment is the same as that of the first embodiment. Finally, an identification result for the unknown pattern is output.

Figure 9:
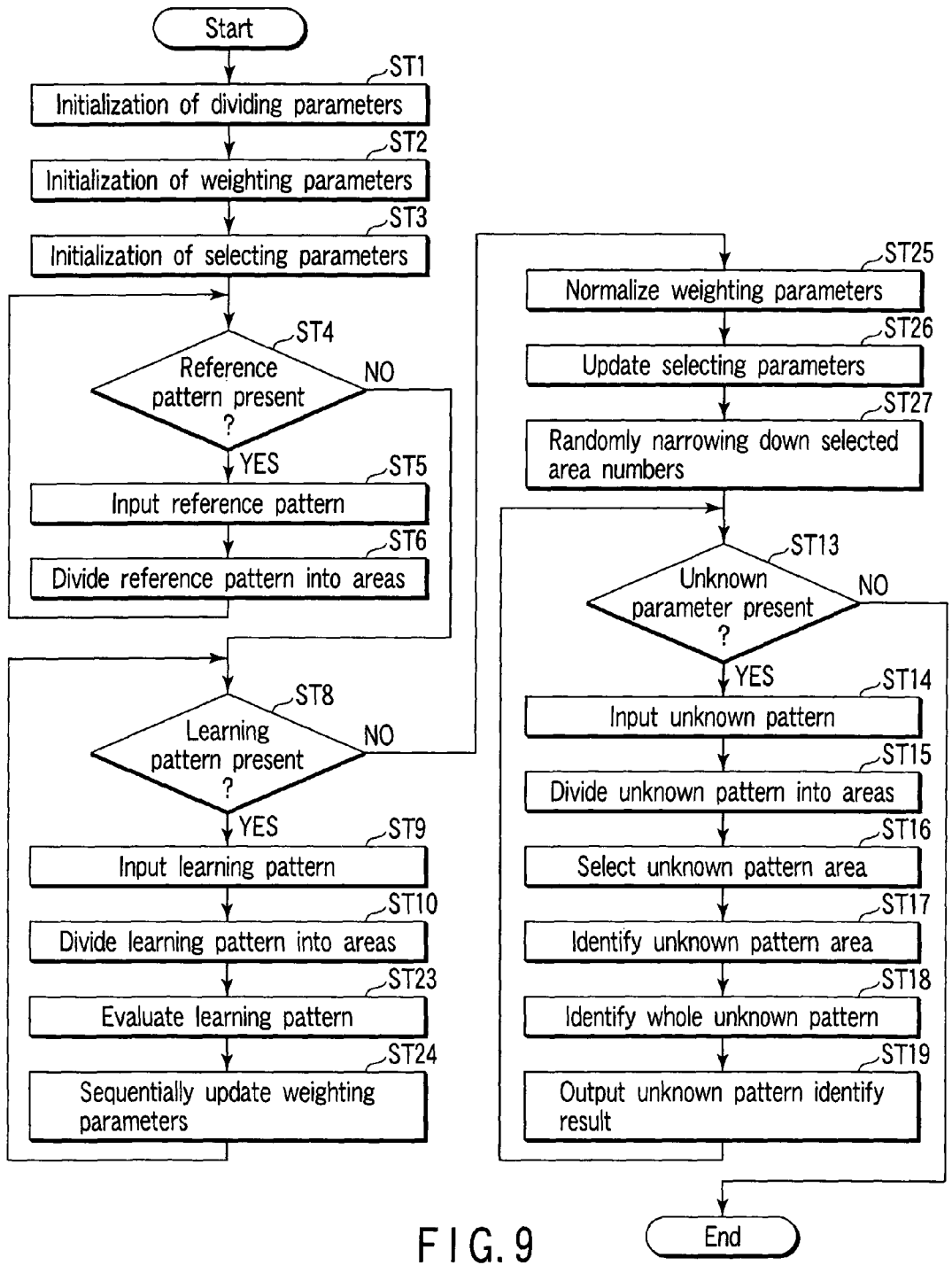
FIG. 9 is a flowchart for illustrating a sheet identifying process according to a modification of the second embodiment.

Further, there is provided a method for repeatedly performing the evaluation process for all of the areas without performing the random area selection and sequentially optimizing the weighting parameter based on the evaluation. FIG. 9 is a flowchart for illustrating a case wherein the random area selection is not performed in the second embodiment. Since the steps in the flowchart are the same as those described above (in FIG. 8), the explanation thereof is omitted.

Thus, according to the second embodiment, the evaluation process for the randomly selected areas or for all of the areas is repeatedly performed and the degrees of weighting of the area are sequentially updated based on the evaluation. As a result, the identification process using parameters corresponding to real data can be performed.

Further, both of the identification performance and reliability can be enhanced by applying a random mask to the selected areas and narrowing down the areas.

Next, a third embodiment of this invention is explained.

Figure 10:
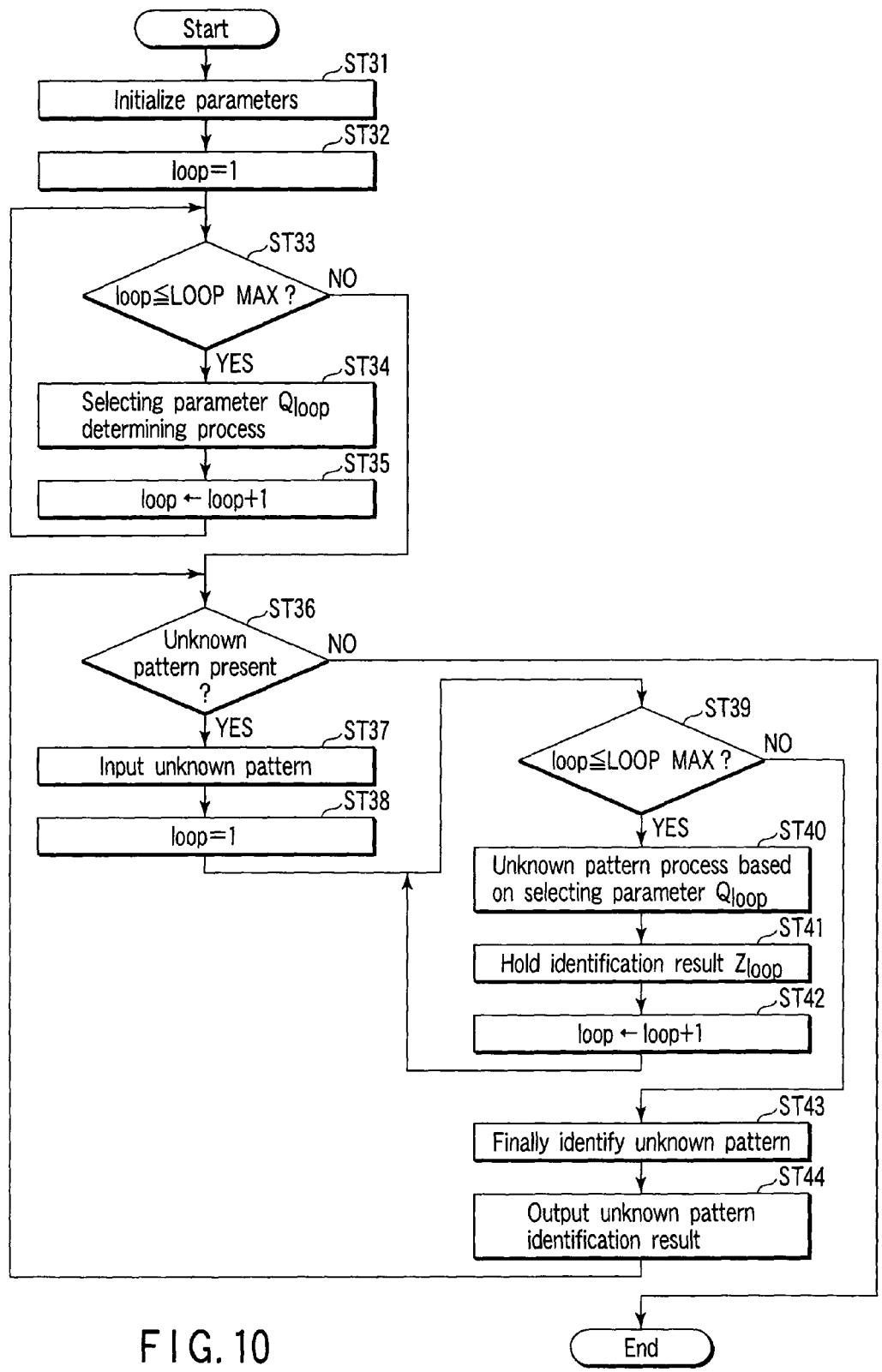
FIG. 10 is a flowchart for illustrating a sheet identifying process according to a third embodiment of this invention.

FIG. 10 is a flowchart for illustrating an identifying process according to the third embodiment. The parameter initialization process corresponds to the dividing parameter initialization process, weighting parameter initialization process and selection parameter initialization process and the explanation thereof is omitted here. The third embodiment has a feature that the final identification result is determined based on the majority rule, logical equation or weighting process thereof for a plurality of identification results obtained by a plurality of area selecting processes.

First, a plurality of area selection processes are performed (ST31, ST32). As the area selection algorithm, the area selection algorithm in the first embodiment or second embodiment can be used. If the number of loops is set to LOOPMAX, selecting parameters Qloop of LOOPMAX can be obtained.

$$Qloop(1 \leq loop \leq LOOPMAX)$$

Thus, the learning phase is completed (ST33 to ST35).

Next, the identification phase is explained. In the identification phase, an unknown pattern is input (ST36, ST37) and the identification result thereof is output (ST38). In this case, however, unlike the first embodiment and second embodiment, unknown pattern processes of LOOPMAX are performed based on the selecting parameters of LOOPMAX and whole identification results of LOOPMAX can be obtained as the result (ST39 to ST42). The unknown pattern is set to x and the whole identification result for the unknown pattern x based on the selecting parameters Qloop is set to z(x, loop).

Then, the final identification process is performed (ST43). As described before, the present embodiment has a feature that the final identification result is determined based on the majority rule, logical equation or weighting process thereof for a plurality of identification results obtained by a plurality of area selecting processes. For example, if the majority rule is applied, the following relations can be obtained.

$z(x)$=class $A$(if $\Sigma$loop|(z(x,loop)=class $A$) most frequently occurs)

$z(x)$=class $B$(if $\Sigma$loop|(z(x,loop)=class $B$) most frequently occurs)

$z(x)$=reject(if $\Sigma$loop|(z(x,loop)=reject)most frequently occurs)

where $\Sigma$loop|(z(x, loop)=class A), $\Sigma$loop|(z(x, loop)=class B) and $\Sigma$loop|(z(x, loop)=reject) respectively indicate the numbers by which the whole identification results become "class A", "class B" and "reject".

Further, it is possible to express the relation between $\Sigma$loop|(z(x, loop)=class A), $\Sigma$loop|(z(x, loop)=class B) and $\Sigma$loop|(z(x, loop)=reject) by use of the logical equation and determine the final identification result.

$z(x)$=class A if the following condition is set up.

$\Sigma$loop|(z(x,loop)=class $B$)/$\Sigma$loop|(z(x,loop)=class $A$)<$\alpha$ and ($\Sigma$loop|(z(x,loop)=class $A$)+$\Sigma$loop|(z(x, loop)=class $B$)>$\Sigma$loop|(z(x,loop)=reject)+$\beta$ $z(x)$=class B if the following condition is set Up.

$\Sigma$loop|(z(x,loop)=class $A$)/$\Sigma$loop|(z(x,loop)=class $B$)<$\alpha$ and ($\Sigma$loop|(z(x,loop)=class $A$)+$\Sigma$loop|(z(x, loop)=class $B$)>$\Sigma$loop|(z(x,loop)=reject)+$\beta$ $z(x)$=reject in the other cases.

In this case, α indicates an adequate constant to define significant difference between classes and β indicates an adequate constant to adjust the rate of "reject".

Further, the weighted majority rule and weighted logical equation can be attained by considering the degrees of weighting of the weighting parameters in the majority rule and logical equation. That is, the following relations can be attained.

$z(x)$=class $A$ (if $\Sigma \text{loop} wi|(z(x,\text{loop})=\text{class } A)$ most frequently occurs)

$z(x)$=class B (if $\Sigma \text{loop} wi|(z(x,\text{loop})=\text{class } B)$ most frequently occurs)

$z(x)$=reject (if $\Sigma \text{loop} wi|(z(x, \text{loop})=\text{reject})$ most frequently occurs)

Alternatively, $z(x)$=class A if the following condition is set up.

$\Sigma \text{loop} wi|(z(x,\text{loop})=\text{class } B)/\Sigma \text{loop} wi|(z(x,\text{loop})=\text{class } A)<\alpha$ and $(\Sigma \text{loop} wi|(z(x,\text{loop})=\text{class } A)+\Sigma \text{loop} wi|(z(x,\text{loop})=\text{class } B))>\Sigma \text{loop} wi|(z(x, \text{loop})=\text{reject})+\beta$ $z(x)$=class B if the following condition is set up.

$\Sigma \text{loop} wi|(z(x,\text{loop})=\text{class } A)/\Sigma \text{loop} wi|(z(x,\text{loop})=\text{class } B)<\alpha$ and $(\Sigma \text{loop} wi|(z(x,loop)=\text{class } A)+\Sigma \text{loop} wi|(z(x,\text{loop})=\text{class } B))>\Sigma \text{loop} wi|(z(x,\text{loop})=\text{reject})+\beta$ $z(x)$=reject in the other cases.

The identification result $z(x)$ of an unknown pattern obtained by the above process is output (ST44).

Thus, according to the third embodiment, if the final identification result is determined based on the majority rule, logical equation or weighting process thereof for a plurality of identification results obtained by a plurality of area selecting processes, the results identified based on various viewpoints can be unified. Therefore, the identification performance which is more robust than that obtained by one area selecting process can be attained.

Next, a fourth embodiment of this invention is explained.

Figure 11:
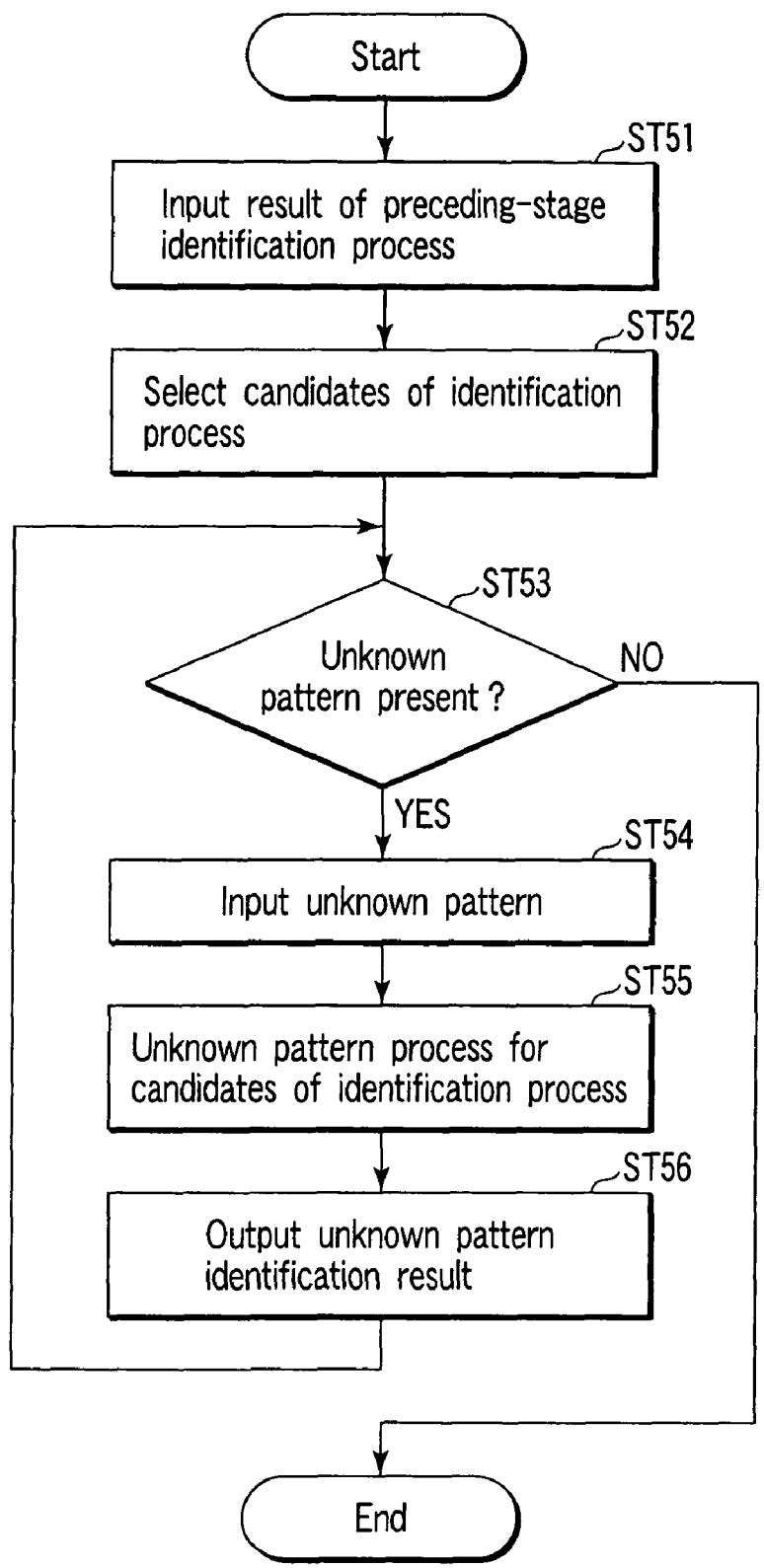
FIG. 11 is a flowchart for illustrating a sheet identifying process according to a fourth embodiment of this invention.

FIG. 11 is a flowchart for illustrating an identifying process according to the fourth embodiment. The fourth embodiment has a feature that the first-order and second-order candidates, a plurality of (n) high-order candidates of the results of the preceding-stage identification processes obtained by different identification means provided in the preceding stage, or two or more candidates of desired orders to be identified, for example, two to n candidates of desired orders to be identified are set as identification process candidates and the final identification result is determined by combining the candidates.

First, the result of the preceding-stage identification process is input (ST51). In the present embodiment, the algorithm of the preceding-stage identification process is not particularly limited, but the result of the identification process is generally expressed by a set of "order, class (category), score (similarity)". For example, the following items are provided.

1, $1, 990
2, $100, 900
3, $20, 500
4, . . .

Next, candidates of the identification process are selected (ST52). For example, it is supposed in the above example that a difference between the score (990) of the first candidate of the result of the preceding-stage identification process and the score (900) of the second candidate is small and determination of "reject" is made for the preceding-stage identification process. At this time, in the present embodiment, the two classes of the first candidate ($1) and the second candidate ($100) are registered as candidates of the identification process. Alternatively, two candidates of desired orders to be identified may be selected. For example, suppose that the following items are provided in another example.

1, $20 (old), 990
2, $20 (new), 980
3, $1, 900
4, . . . .

The scores of the first candidate ($20 (old)) and the second candidate ($20 (new)) are close to each other, but only the generations thereof are different and the amounts thereof are the same, that is, distinct identification thereof is not required in some cases. In such a case, for example, the first candidate ($20 (old)) and third candidate ($1) are selected.

In this way, after the candidates of the identification process are selected, an unknown pattern is input (ST53, ST54) and the unknown pattern is processed for the candidates of the identification process (ST55). Since the processing contents are the same as those of the other embodiments described above, the explanation thereof is omitted here.

The unknown pattern identification result $z(x)$ obtained by the above process is output (ST56).

In the fourth embodiment, it is supposed that no error occurs in the preceding-stage identification process, but in the practical case, an error may occur in the preceding-stage identification process in some cases. For example, the first candidate is $20 (old) and the second candidate is $20 (new) in the preceding-stage identification process, but there occurs a case wherein the correct answer is $20 (new). Therefore, there is provided a method for setting the number of candidates selected based on the result of the preceding-stage identification process to "n" instead of "2", processing an unknown pattern with respect to the n candidates and determining the final identification result based on the processing results.

FIG. 12 is a flowchart for illustrating a case wherein the process is performed with respect to the n candidates in the fourth embodiment and then the final identification result is determined. The process (ST57) of combining first-order unknown pattern identification results is additionally provided in the process shown in FIG. 11. The first-order unknown pattern identification result $z_{ij}(x)$ is an unknown pattern identification result obtained based on the i-th and j-th candidates. The explanation is made in the following case.

1, $20 (old), 990
2, $20 (new), 980
3, $1, 900

In this case, for example, suppose that the first-order unknown pattern identification results are set as follows.

$z_{12}(x)$=$20 (new)
$z_{13}(x)$=reject
$z_{23}(x)$=$20 (new)

The result that $z_{12}(x)$=$20 (new) is obtained even if the first candidate of the result of the preceding-stage identification process is $20 (old). Further, $z_{13}(x)$ is "reject". In such a case, it is considered to use a method for determining that an error occurs in the preceding-stage identification process and the result of $z_{23}(x)$ is set as the final unknown pattern identification result.

Thus, according to the fourth embodiment, the number of classes to be processed can be reduced by setting the first-order and second-order candidates, a plurality of (n) high-order candidates of the results of the preceding-stage identification processes obtained by different identification means provided in the preceding stage, or two or more candidates of desired orders to be identified as identification process candidates and determining the final identification result by combining the candidates. Further, even when determination of "reject" is made in the preceding-stage identification process, determination of "accept" can be made according to the high identification performance of this invention in some cases.

Next, a fifth embodiment of this invention is explained.

Figure 13:
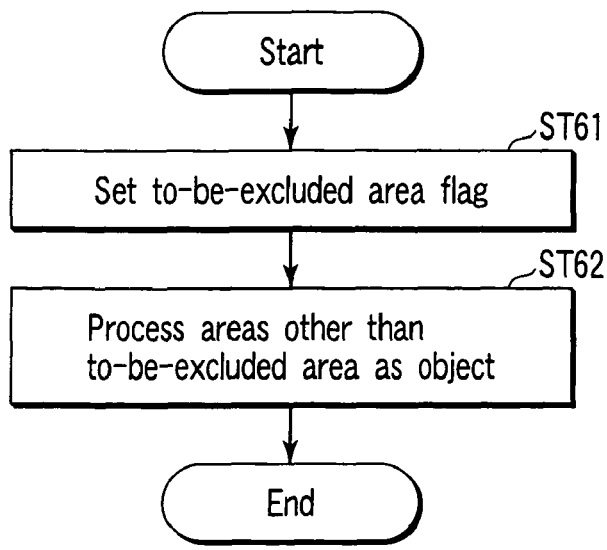
FIG. 13 is a flowchart for illustrating a sheet identifying process according to a fifth embodiment.

FIG. 13 is a flowchart for illustrating the identifying process according to the fifth embodiment. The fifth embodiment has a feature that an area in which a signature or stamp to be written or printed on a paper sheet or the like whose feature is unstable and which is already known to be excluded is previously registered as a to-be-excluded area and, after this, an area other than the to-be-excluded area is processed as an object.

For example, a to-be-excluded area flag is set for each area, the to-be-excluded area flag is set to "1" if the area is a to-be-excluded area and it is set to "0" if the area is not a to-be-excluded area (ST61). Thus, it is possible to determine whether or not the area is a to-be-excluded area. Since the process performed after the to-be-excluded area flag setting process (ST61) is the same as that explained in the other embodiments, the explanation thereof is omitted here.

Thus, according to the fifth embodiment, since the process after the area selection process can be performed with the area other than the to-be-excluded area used as an object by previously registering the known to-be-excluded area, a high-speed and stable identification process can be attained.

Next, a sixth embodiment of this invention is explained.

Figure 14:
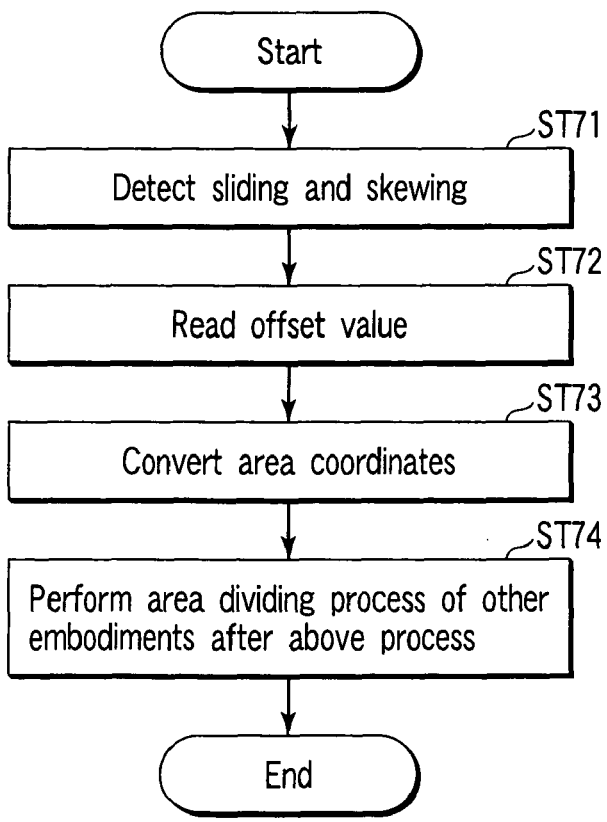
FIG. 14 is a flowchart for illustrating a sheet identifying process according to a sixth embodiment of this invention.

FIG. 14 is a flowchart for illustrating an identifying process according to the sixth embodiment. In the sixth embodiment, skewing and sliding of a paper sheet or the like caused by the feeding condition of the paper sheet are detected (ST71), corresponding offset values are read according to an offset conversion table previously prepared based on the detected sliding amounts and skewing amounts (ST72), and the coordinates of the respective areas are converted according to the offset values (ST73). After the coordinate conversion process, a process starting from the area dividing process is performed (ST74). Since the process starting from the area dividing process is the same as that described in the other embodiments, the explanation thereof is omitted here.

FIG. 15 is a schematic diagram for illustrating the sixth embodiment. When a paper sheet P is fed, the position of the paper sheet P is detected by use of a transmission light sensor, for example. Assume now that the position (reference position) of the paper sheet P is expressed as follows when it is input in an ideal feeding condition of the paper sheet P.

$$(X_{LT}, Y_{LT}), (X_{RT}, Y_{RT}), (X_{LB}, Y_{LB}), (X_{RB}, Y_{RB})$$

where $(X_{LT}, Y_{LT})$ indicates the coordinate of the upper left end point of the paper sheet P, $(X_{RT}, Y_{RT})$ indicates the coordinate of the upper right end point of the paper sheet P, $(X_{LB}, Y_{LB})$ indicates the coordinate of the lower left end point of the paper sheet P and $(X_{RB}, Y_{RB})$ indicates the coordinate of the lower right end point of the paper sheet P.

Next, assume that the position of the paper sheet P is expressed as follows when it is input under an influence of sliding and skewing caused by the feeding state of the paper sheet P or the like.

$$(X'_{LT}, Y'_{LT}), (X'_{RT}, Y'_{RT}), (X'_{LB}, Y'_{LB}), (X'_{RB}, Y'_{RB})$$

where $(X'_{LT}, Y'_{LT})$ indicates the coordinate of the upper left end point of the paper sheet P, $(X'_{RT}, Y'_{RT})$ indicates the coordinate of the upper right end point of the paper sheet P, $(X'_{LB}, Y'_{LB})$ indicates the coordinate of the lower left end point of the paper sheet P and $(X'_{RB}, Y'_{RB})$ indicates the coordinate of the lower right end point of the paper sheet P. At this time, the sliding amounts of the paper sheet P are derived as follows, for example.

$$\Delta X_C = X'_C - X_C$$

$$\Delta Y_C = Y'_C - Y_C$$

Note that Xc, Yc, X'c and Y'c are calculated as follows:

$$X_C = (X_{LT} + X_{RT} + X_{LB} + X_{RB})/4$$

$$Y_C = (Y_{LT} + Y_{RT} + Y_{LB} + Y_{RB})/4$$

$$X'_C = (X'_{LT} + X'_{RT} + X'_{LB} + X'_{RB})/4$$

$$Y'_C = (Y'_{LT} + Y'_{RT} + Y'_{LB} + Y'_{RB})/4$$

That is, the method is to derive the centers of gravity of the four end point coordinates in the ideal case and in a case where the influence by sliding and skewing is applied and set a difference between the two centers of gravity as a sliding amount.

Further, the skewing amount is derived as follows, for example.

$$\theta = \arctan[(Y'_{RT} - Y'_{LT})/(X'_{RT} - X'_{LT})] \text{ or}$$

$$\theta = \arctan[(Y'_{RB} - Y'_{LB})/(X'_{RB} - X'_{LB})]$$

That is, there is provided a method for deriving the inclination based on the coordinates of the upper left end point and upper right end point or the coordinates of the lower left end point and lower right end point of the paper sheet or the like and calculating the skew amount.

The coordinates of the respective areas are converted as follows based on the thus derived sliding amounts $\Delta X_C$, $\Delta Y_C$ and skew amount $\theta$.

$$X'_i = X_i \cos[\theta] - Y_i \sin[\theta] + \Delta X_C$$

$$Y'_i = X_i \sin[\theta] + Y_i \cos[\theta] + \Delta Y_C$$

where $(X_i, Y_i)$ is the coordinates of the n-th pixel in the i-th area in the ideal case and $(X'_i, Y'_i)$ is the coordinates of the n-th pixel in the i-th area when the influence by sliding and skewing is taken into consideration.

Basically, the coordinates conversion is performed on all pixels in the region. Nonetheless, the conversion may be performed on only the center pixel in the region in a simple method. In this case, paper sheets can be identified at a high speed, while reducing the influence of the sliding and skewing of each paper sheet.

Since the amounts of calculations for the trigonometric function such as arctan, cos and sin are large, a method for previously registering partial calculation results into an offset conversion table and reading and using a corresponding offset value from the offset conversion table at the processing time can be considered.

The coordinates conversion is performed without changing the inclination of the extraction frame. In this case, the efficiency of identifying paper sheets may decrease. Nonetheless, almost all influence of the sliding and skewing of each paper sheet can be eliminated, because the coordinates of the center pixel are corrected (or converted). In view of this, the conversion performed without changing the inclination of the extraction frame is results in no problems. Rather, it is advantageous because of the high-speed sheet identification it achieves.

Thus, according to the sixth embodiment, sliding and skewing of the paper sheet caused by the feeding state of the paper sheet are detected, a corresponding offset value is read from the prepared offset conversion table based on the sliding amount and skewing amount and the coordinates of the respective areas are converted by use of the offset value. Then, the succeeding area dividing process can be performed at high speed with high precision.

Further, a seventh embodiment of this invention is explained.

Figure 17:
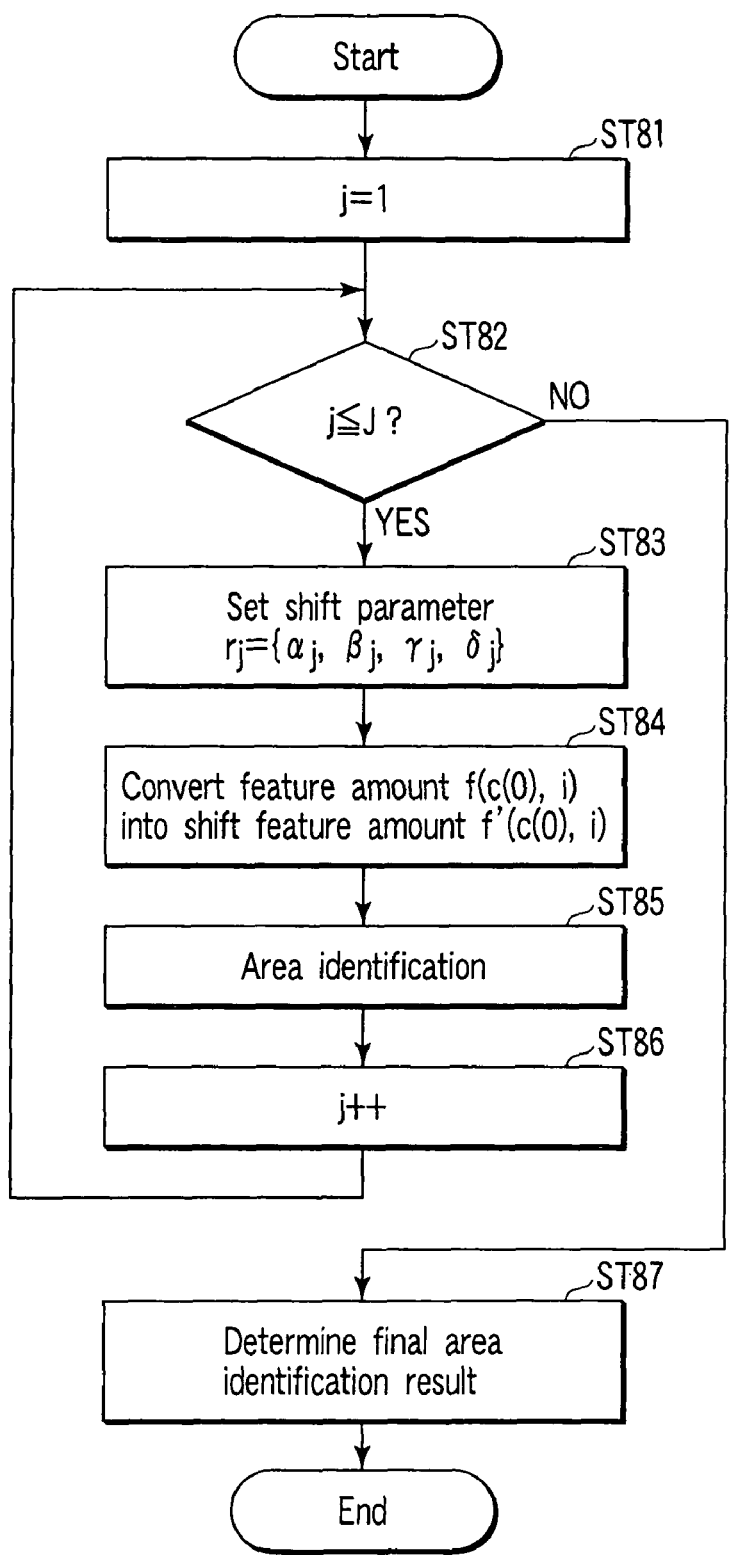
FIG. 17 is a flowchart for illustrating a sheet identifying process according to a seventh embodiment of this invention.

FIG. 17 is a flowchart for illustrating an identifying process according to the seventh embodiment. The seventh embodiment has a feature that processes are repeatedly performed with the coordinate and temperature swung in a preset range with respect to one or two objective patterns when the identification result is obtained for each area and the identification results are determined based on the above processes.

The state in which the coordinate and concentration are swung is expressed by use of a parameter and is called a "shift parameter". The shift parameter is expressed as follows, for example.

$$r_j = \{\alpha_i, \beta_i, \gamma_i, \delta_i\}$$

where $r_j$ is an j-th shift parameter ($1 \leq j \leq J$), $\alpha$ is a factor expressing the horizontal offset, $\beta$ is a factor expressing the vertical offset, $\gamma$ is a factor expressing the concentration gain and $\delta$ is a factor expressing the concentration offset. The range in which $\alpha$ and $\beta$ can be set is a reference ±one (pixel), for example. Further, the range in which $\gamma$ can be set is a reference ±20(%) and the range in which $\delta$ can be set is a reference ±2 (levels).

In the present embodiment, the feature amount $f(c(0), i)$ of the i-th area of the reference pattern $c(0)$ of a class c is converted into a shift feature amount $f'(c(0), i)$ based on the set shift parameters for J shift parameters (ST81 to ST84) and the process is performed for the shift feature amount (ST85, ST86).

Figure 18:
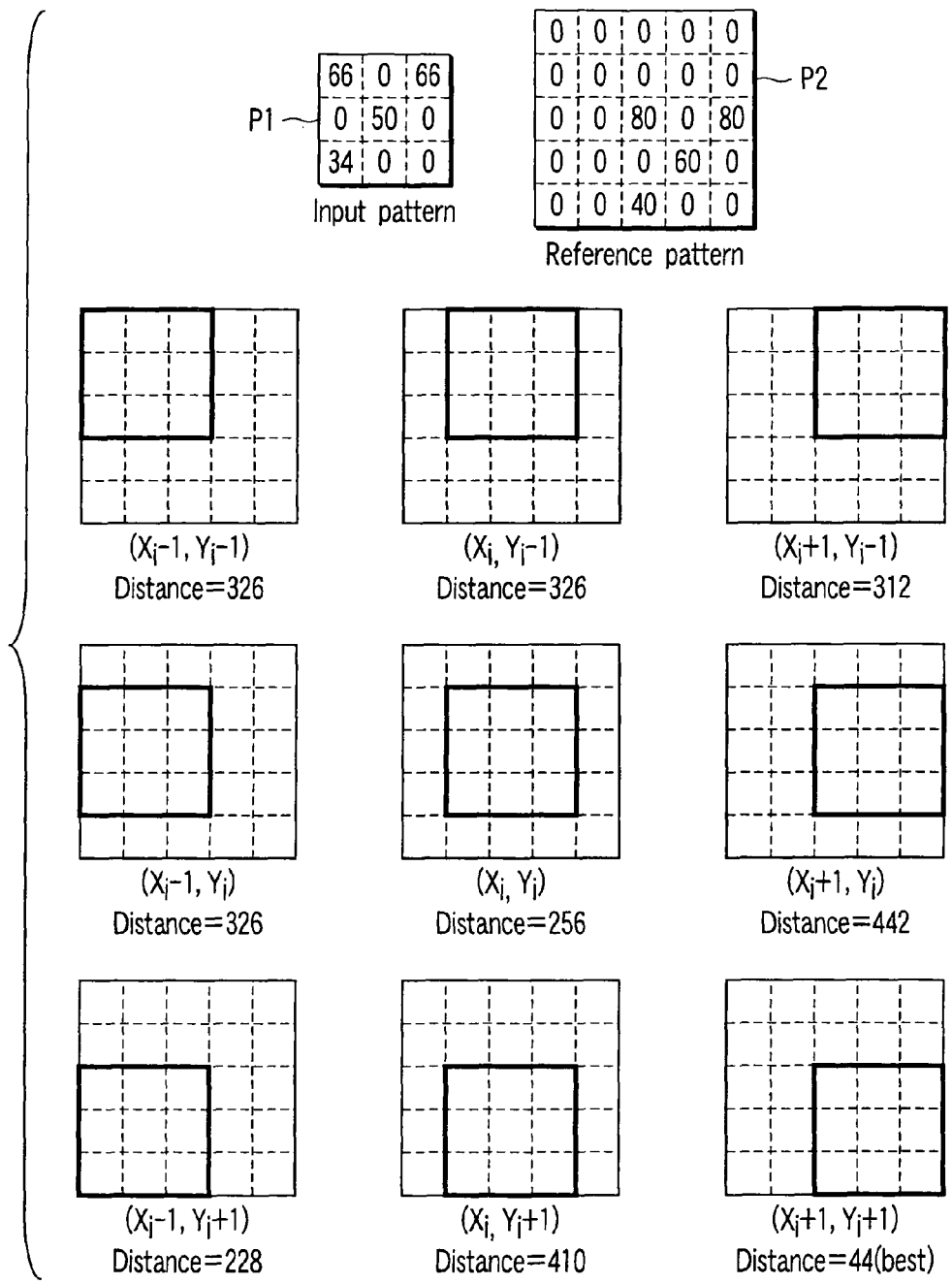
FIG. 18 is a schematic diagram for illustrating the coordinate changing way in the seventh embodiment.

Next, the way of swinging the coordinate is explained. FIG. 18 is a schematic diagram for illustrating the coordinate swinging way. In FIG. 17, the range in which $\alpha$ and $\beta$ which are offset amounts relating to the coordinate can be set is a reference ±one (pixel). Now, consider a case wherein a distance between an input pattern (i-th area) P1 extracted as shown in FIG. 18 and a reference pattern P2 as shown in FIG. 18 is calculated. In FIG. 18, $(X_i, Y_i)$ indicates the reference coordinate of the i-th area. The distance is "256" when $\alpha$ and $\beta$ are "0" (reference coordinate).

In this case, for clarifying the explanation, the distance is not set to the Euclid distance but is set to the sum of the concentration differences between the pixels of the two patterns. For example, the distance is expressed as follows when $\alpha$ and $\beta$ are "0" (reference coordinate).

|0−66|+|0−0|+|0−66|+|0−0|+|80−50|+|0−0|+|0−34|+
|0−0|+|60−0|=256

In FIG. 18, it is indicated that the distance becomes minimum (44) when $\alpha$ and $\beta$ are "1".

Next, the way of swinging the concentration is explained. FIG. 19 is a schematic diagram for illustrating the concentration swinging way. In FIG. 19, the range in which the concentration gain value $\gamma$ can be set is a reference ±20(%) and the range in which the concentration offset amount $\delta$ can be set is a reference ±2 (levels). Now, consider a case wherein a distance between an input pattern P3 shown in FIG. 19 and a reference pattern P4 is calculated. As the definition of the distance, the sum of the concentration differences of the pixels between the two patterns is obtained like the above case. For example, the distance becomes "44" at the time of $\gamma = 100$ and $\delta = 0$ (reference concentration). In FIG. 19, it is indicated that the distance becomes minimum (0) when $\gamma = 80$ and $\delta = 2$.

Thus, the coordinate and concentration can be swung in preset ranges to obtain J processing results in total. Finally, the final area identification result is determined based on the J processing results (ST87). As one example of the simplest determining method, the value of the distance which becomes minimum among the J processing results is used. In the above example, since the distance becomes minimum (0) at the time of $\alpha = 1$, $\beta = 1$, $\gamma = 80$ and $\delta = 2$, the value is used. As another method, it is considered to use a mean value of the J distances.

As described above, according to the seventh embodiment, even if sliding, skewing and illumination variations caused by the feeding state of the paper sheet occur and errors of a preset range occur in the feature amounts of the areas, the feature amount can be converted with the influence by the above errors taken into consideration by repeatedly performing the processes with the coordinate and concentration swung in the preset ranges for the one or two object patterns and determining the identification result based on the above processes when the identification results are obtained for the respective areas. Thus, the succeeding area identification process can be precisely performed.

This invention is not limited to the above embodiments. For example, since a multiple class identification problem is substantially equal to superposition of 2-class identification problems, this invention can be applied to this case. Further, the area identification algorithm is not limited to the algorithm using the Euclid distance and, for example, various methods such as the simple similarity method, subspatial method and vector quantization method can be applied.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A sheet identification apparatus comprising:
a dictionary configured to store a selection area and an image corresponding to the selection area, the selection area being used for identification and selected from among a plurality of areas of an image which is used as a reference when a sheet is to, be identified;
a feeding module configured to feed a sheet to be identified;
an image input module configured to input an image of the sheet fed by the feeding module;
a feed state detecting module configured to detect a sliding amount, a skew amount, and a coordinate of a center pixel of the sheet that is being fed, based on coordinates of corners of the sheet of the image input by the image input module;
an area dividing module configured to divide the image input by the input module into predetermined areas;
a convert module configured to convert only a coordinate of a center pixel of the selection area stored in the dictionary, based on the sliding amount, the skew amount, and the coordinate of a center pixel detected by the feed state detecting module and without changing inclination of the selection area;
an identification result acquiring module configured to detect a degree of similarity between the image of the selection area converted by the convert module and an image of an area corresponding to the selection area, and to obtain an identification result for each image; and
an identification result determining module configured to determine an overall identification result, based on the identification result acquired by the identification result acquiring module for each image.

2. The sheet identification apparatus according to claim 1, wherein
the identification result determination includes a coordinate conversion module configured to read an offset value corresponding to the skew amount and slide amount detected by the feed state detecting module from an offset conversion table prepared beforehand, and to convert only a coordinate of a center pixel of the selection area to be input by the image input module, based on the read offset value and without changing the inclination of the selection area.

3. The sheet identification apparatus according to claim 1, wherein the identification result determining module determines the overall identification result based on one of a majority rule, a logical equation and a weighting process corresponding to the identification result for each area acquired by the identification result acquiring module.

4. The sheet identification apparatus according to claim 1, wherein the identification result determining module is configured to select a first-order candidate, a second-order candidate or a plurality of high-order candidates obtained by an identification module connected to an input thereof, alternatively select at least two candidates of desired orders to be identified as identification process candidates, and determine the overall identification result by use of the selected candidates.

5. A sheet identification method comprising:
storing a selection area and an image corresponding to the selection area beforehand, the selection area being used for identification and selected from among a plurality of areas of an image which is used as a reference when a sheet to be identified;
inputting an image of the sheet which is being fed;
calculating a sliding amount, a skew amount, and a coordinate of a center pixel of the sheet which is being fed, based on coordinates of corners of the sheet of the image input by the image input module;
dividing the input image into predetermined areas;
converting only a coordinate of a center pixel of the image of the stored selection area, based on the sliding amount, the skew amount, and the coordinate of a center pixel calculated and without changing the inclination of the selection area;
detecting a degree of similarity between the image of the rotated selection area and an image of an area corresponding to the selection area, and obtaining an identification result for each image; and
determining an overall identification result, based on the identification result obtained for each image.

6. The sheet identification method according to claim 5, further comprising:
reading an offset value corresponding to the skew amount and slide amount from an offset conversion table prepared beforehand, and converting only a coordinate of a center pixel of the selection area to be input, based on the read offset value and without changing the inclination of the selection area.

7. A dictionary preparing method comprising:
inputting an image of a sheet which is to be used as a reference when a plurality of types are to be identified;
dividing the input image into predetermined areas;
calculating a standard deviation for each area with respect to each of the types, based on images of a plurality of sheets;
calculating a weight parameter based on an image of a sheet;
dividing the calculated weight parameter by the calculated standard deviation;
normalizing a quotient of said dividing, and determining a weight;
performing weighting for each area, based on the determined weight;
selecting a predetermined number of areas from among the weighted areas in a descending order of weights; and
storing the selected areas and the input image in a dictionary.

8. The dictionary preparing method according to claim 7, further comprising: selecting an area from areas other than to-be-excluded areas stored beforehand.

* * * * *